A. F. MASURY.
TRAILER CONNECTION.
APPLICATION FILED AUG. 28, 1919.

1,380,490.

Patented June 7, 1921.

WITNESS

INVENTOR
Alfred F. Masury
BY
ATTORNEYS

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

TRAILER CONNECTION.

1,380,490. Specification of Letters Patent. Patented June 7, 1921.

Application filed August 28, 1919. Serial No. 320,340.

*To all whom it may concern:*

Be it known that I, ALFRED F. MASURY, a citizen of the United States, residing in the borough of Manhattan, of the city of New York, in the State of New York, have invented certain new and useful Improvements in Trailer Connections, of which the following is a specification, reference being had to the accompanying drawing, forming a part hereof.

This invention relates to an improved trailer connection intended primarily for use on auto tractors for the attachment thereto of semi-trailers. The connection, for convenience in description, may be termed a "fifth wheel" connection, although as the description proceeds it will be evident that this term is not technically correct in that no fixed king bolt is employed but, rather, a reverse construction is used in which rotative movement of the parts is obtained by means of a wheel and ring connection.

The principal object of the invention is to provide a connection of the character described which may be readily attached to auto tractors and to semi-trailers and which will permit the ready coupling and uncoupling of such vehicles without the usual tedious manipulation and without the use of a great number of permanent securing devices. A further object of the invention is to provide a fifth wheel construction which will completely absorb all starting and stopping shocks and compensate for twisting strains, thereby relieving the tractor and trailer frames of the strains usually imposed on them. A further object of the invention is to provide a connection in which the parts shall be subjected to minimum wear, the wheel and ring affording much greater bearing surfaces than would be found in a fifth wheel construction employing a king bolt.

In accordance with the invention a turn-table is mounted on a ring on the trailer frame and carries a universal joint on which is a toothed plate with which engages a complementary toothed plate bolted to the under side of the semi-trailer. In the universal joint are included equalizer springs to oppose the universal movement yieldingly thereby providing for the absorption of twisting strains which ordinarily will be transmitted to the semi-trailer by the tractor frame. There are also included in the universal joint anti-shock springs adapted to absorb the starting or stopping stresses, thereby relieving the parts of undue strains at such times and insuring an easy acceleration and retardation.

The invention will be described in greater detail in connection with the illustrated embodiment shown in the drawing, in which—

Figure 1:
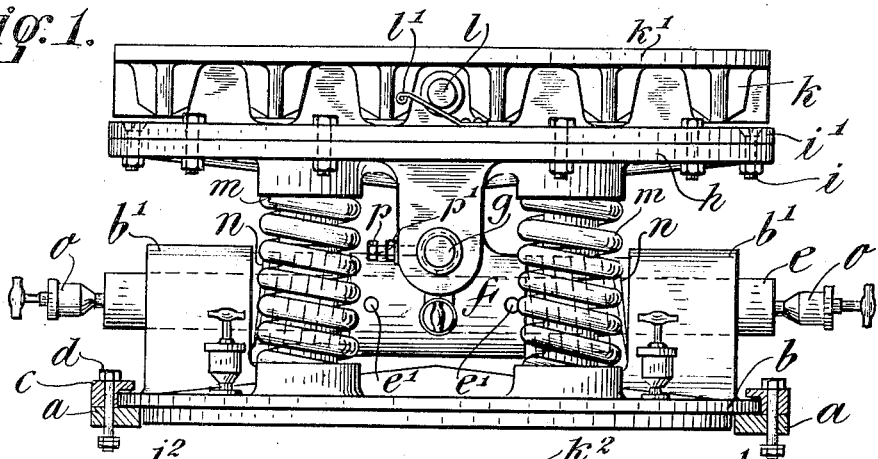
Figure 1 is a view in side elevation of the complete attachment, the trailer plate being shown in position and the supporting ring for the turn-table being shown in section.
Figure 2:
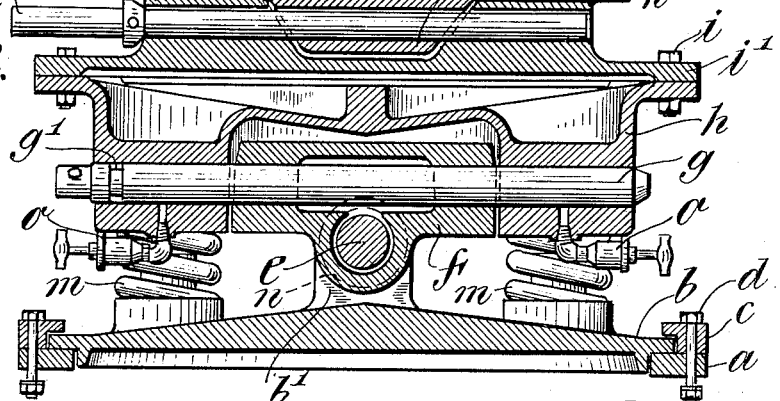
Fig. 2 is a view in section taken transversely of the vehicle through the attachment shown in Fig. 1.
Figure 3:
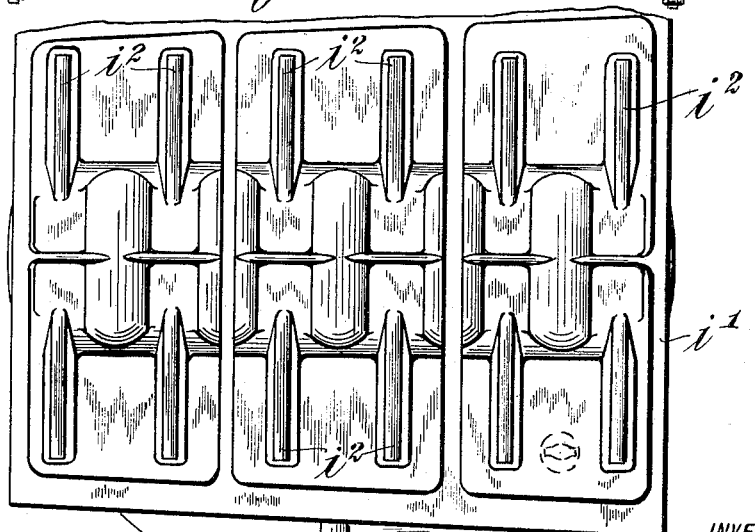
Fig. 3 is a view in plan showing a fragment of the upper plate of the universal connection, the trailer plate being removed.

The fifth wheel connection which it is desirable to secure in a connection between a tractor and a semi-trailer is realized in accordance with the present invention by devices which do not constitute properly a fifth wheel but which do allow for turning movement of the trailer with relation to the tractor and all of the ordinary twisting movement incidental to use. No king bolt as such is employed, the turning movement being secured by means of a turn-table which carries the connecting elements and which is supported on the tractor frame. As shown in Figs. 1 and 2, the ring $a$ is the main support for the lower plate $b$ of the connection, the ring $a$ being of the greatest possible diameter, taking into account the character of the vehicle frame on which it is supported, in order to afford the greatest possible bearing and wearing surface between the ring and the plate. The plate $b$ is held in place by means of a gib $c$ which is secured to the ring $a$ by means of bolts $d$. On the plate $b$ are formed bearings $b'$ to receive a shaft $e$ which is journaled in said bearings and passes through a cross connection $f$ of the universal joint. In this cross connection is supported a second shaft $g$ which extends at right angles to the shaft $e$ and passes through the upper plate $h$ of the fifth wheel. To the upper plate $h$ is bolted, as by means of bolts $i$, a coupling plate $i'$ on the upper face of which are cast ribs or teeth $i^2$ to coöperate with ribs or teeth $k$ cast on the lower face of a coupling plate $k'$ which is intended to be secured to the underside of the body of the semi-trailer (not illustrated). When the coupling plates $k'$, $i'$ are in the position illustrated in Figs. 1 and 2, they may be readily locked in place by means of a removable locking bolt $l$, releasably held in position by some convenient means, such as a leaf spring $l'$, which may be secured to the coupling plate $i'$. The coupling plate $i'$ is formed with a rib $i^2$ which is bored to receive the locking bolt $l$ and the other plate $k'$ is formed with a rib $k^2$, which is also bored to receive the bolt $l$, the holes in the ribs $i^2$, $k^2$ being alined automatically when the two coupling plates are brought together.

From the description given it will be evident that angular movement between the trailer and the tractor frames is provided for by the relation of the lower plate $b$ to the ring $a$ and the universal movement of the body of the trailer with relation to the body of the tractor is also provided for by means of the connecting shafts $e$ and $g$, as described. In order to oppose yieldingly such universal movement and absorb the strains which might otherwise be imposed on the connecting elements or on the frame of the tractor or the trailer, springs $m$, preferably four in number, are interposed operatively between the lower plate $b$ and the upper plate $h$ of the fifth wheel, these springs being positioned uniformly at opposite sides of the shafts $e$ and $g$. Their action in absorbing twisting strains will be apparent since rocking of the upper plate $h$ about either the axis of the shaft $g$ or the axis of the shaft $e$ will result in the compression of one or more of the springs in a manner which will be evident. In order to absorb the shocks incident to the starting and stopping of a tractor with a trailer anti-shock coiled springs $n$ are placed about the shaft $e$ between the bearings $b'$ therefor and the cross connection $f$. It is to be understood that the shaft $e$ is disposed longitudinally of the tractor frame when the fifth wheel is in normal position so that the springs $n$ will offer resistance to the starting and stopping of the tractor and thereby cushion the strains which otherwise would be impressed on the elements of the connection or on the trailer and tractor frames.

Grease cups $o$ are placed in such number and such relation to the plates and shafts as to insure adequate lubrication thereof at all times.

The shaft $g$ is held against longitudinal movement by means of the engagement of the screw $p$ with an annular slot $g'$ in the shaft, the screw $p$ being locked in place in the upper plate $i'$ by means of a lock nut $p'$. The shaft $e$ is held against longitudinal movement in the cross connection $f$ by suitable shaft pins $e'$.

The operation of the improved connection and the advantages should be apparent from the foregoing description. The wear on the rotatable plate $b$ and its supporting ring $a$, by reason of the large superficial surface therebetween, will be negligible and, of course, much less than would be present in a construction where a king pin is relied upon. The coupling or uncoupling of the semi-trailer to the tractor is greatly facilitated by the peculiar character of the coupling plate $i'$, $k'$. The coöperating teeth on these plates serve to bring the plates together and insure their proper relationship automatically when the trailer is brought into proper relation to the tractor. The ribs $i^2$, $k^2$ are alined properly at the time of this coupling so that the single locking bolt $l$ may be quickly passed through the openings in said ribs and locked in place by the retaining spring $l'$. The action of the springs $m$ in absorbing all twisting strains and the action of the anti-clock spring $n$ in absorbing the strains of starting and stopping, have been pointed out hereinbefore. The entire connection is one which may be readily assembled and disassembled in the first instance and it will be evident that a permanent connection betwen a semi-trailer and tractor might be made by substituting for the plates $i$ and $k$ a single plate on the trailer which could be bolted to the upper plate $h$ of the connection. It is equally evident that by removing the gib $c$ the entire fifth wheel as a unitary structure might be removed from the frame of the tractor.

The other elements of the combination by which the improved results are attained are set out in the accompanying claims.

I claim as my invention:

1. A connection for semi-trailers comprising in combination a ring carried on the tractor unit, a plate rotatably supported thereon, a universal joint comprising two shafts extending at right angles to each other mounted on the plate, a second plate constituting an element of the universal joint, means to connect the semi-trailer to the second plate, and equalizer springs operatively interposed in all the quadrants formed by said shafts between said plates to counteract the universal movements.

2. A connection for semi-trailers comprising in combination a ring carried by the tractor unit, a plate rotatably supported thereon, a shaft journaled on said plate, a cross coupling member supported on the shaft, a second shaft journaled in said coupling member and extending at right angles to the first shaft, a second plate supported on the second shaft, means to connect the semi-trailer to the second plate, and equalizer springs operatively interposed at opposite sides of said shaft between said plates to counteract the universal movements.

3. A connection for semi-trailers comprising in combination an attachment mounted rotatably on the tractor unit and having capacity for universal movement, a plate carried on said attachment and formed with ribs, a second plate carried on the semi-trailer and formed with ribs to nest with the ribs on the first named plate when the plates are brought together, and a locking bolt adapted to pass through registering holes formed in said plates.

4. A connection for semi-trailers comprising in combination a ring carried on the tractor unit, a plate rotatably supported thereon, a universal joint mounted on the plate, a second plate constituting an element of the universal joint and formed with ribs, a third plate carried on the semi-trailer and formed with ribs to nest with the ribs on the second named plate, and a locking bolt adapted to pass through registering holes formed in the second and third plates.

5. A connection for semi-trailers comprising in combination a ring carried by the tractor unit, a plate rotatably supported thereon, a shaft journaled on said plate, a cross coupling member supported on the shaft, a second shaft journaled in said coupling member and extending at right angles to the first named shaft and in the plane of directional movement of the tractor, equalizer springs placed in all of the quadrants formed by the shafts, a second plate supported on the second shaft, means to connect the semi-trailer to the second plate, and spiral anti-shock springs coiled about said second shaft and operatively disposed with respect to said coupling member to absorb starting and stopping strains.

This specification signed this 26th day of August, A. D. 1919.

ALFRED F. MASURY.